United States Patent
Borders et al.

(10) Patent No.: US 10,410,176 B2
(45) Date of Patent: Sep. 10, 2019

(54) PRODUCT AND EQUIPMENT LOCATION AND AUTOMATION SYSTEM AND METHOD

(71) Applicant: HDS Global, Inc., Palo Alto, CA (US)

(72) Inventors: Louis H. Borders, Portola Valley, CA (US); Ramesh Sekhar, Santa Clara, CA (US); Robert Olson, Los Altos, CA (US); Peter Mills, Los Altos, CA (US); Hans Van Leeuwen, Amsterdam (NL)

(73) Assignee: HDS Mercury, Inc., Palo Alto, CA (US)

( * ) Notice: Subject to any disclaimer, the term of this patent is extended or adjusted under 35 U.S.C. 154(b) by 0 days.

(21) Appl. No.: 15/965,472

(22) Filed: Apr. 27, 2018

(65) Prior Publication Data

US 2018/0247259 A1  Aug. 30, 2018

Related U.S. Application Data

(63) Continuation-in-part of application No. 14/985,199, filed on Dec. 30, 2015, now abandoned.

(60) Provisional application No. 62/230,132, filed on May 28, 2015.

(51) Int. Cl.
| | | |
|---|---|---|
| *G06Q 10/08* | (2012.01) | |
| *G06K 19/07* | (2006.01) | |
| *H04W 4/80* | (2018.01) | |
| *H04W 4/35* | (2018.01) | |
| *H04W 4/029* | (2018.01) | |
| *G01S 13/87* | (2006.01) | |
| *G06K 7/10* | (2006.01) | |
| *G01S 5/14* | (2006.01) | |

(52) U.S. Cl.
CPC ............ *G06Q 10/087* (2013.01); *G01S 5/14* (2013.01); *G01S 13/878* (2013.01); *G06K 7/10128* (2013.01); *G06K 19/0723* (2013.01); *H04W 4/029* (2018.02); *H04W 4/35* (2018.02); *H04W 4/80* (2018.02)

(58) Field of Classification Search
CPC ....... G06Q 10/087; G01S 5/14; G01S 13/878; G06K 7/10128; G06K 19/0723; H04W 4/029; H04W 4/35; H04W 4/80
USPC ....................................................... 455/41.1
See application file for complete search history.

(56) References Cited

U.S. PATENT DOCUMENTS

| | | |
|---|---|---|
| 5,519,381 A | 5/1996 | Marsh et al. |
| 8,421,601 B2 | 4/2013 | Greenlee et al. |
| 8,451,098 B2 | 5/2013 | Posamentier |
| 8,502,670 B2 | 8/2013 | Cha et al. |
| 8,639,644 B1 | 1/2014 | Hickman et al. |

(Continued)

FOREIGN PATENT DOCUMENTS

| | | |
|---|---|---|
| CN | 106093858 | 6/2016 |
| KR | 101105009 | 12/2010 |
| KR | 101254031 | 3/2011 |

*Primary Examiner* — Eugene Yun
(74) *Attorney, Agent, or Firm* — Cherskov Flaynik & Gurda, LLC

(57) ABSTRACT

A system for location of assets on a premises is described. The system uses identifiers attached to a group of one or more assets along with mobile sensor packages. Each mobile sensor package contains components for data processing, data exchange, and storage. The sensor package also contains a sensor for reading identifiers and a location tool. The mobile sensor packages are attached to each mover of assets on the premises.

20 Claims, 13 Drawing Sheets

(56) References Cited

U.S. PATENT DOCUMENTS

| | | | |
|---|---|---|---|
| 8,896,421 B2 | 11/2014 | Kaplan | |
| 8,905,317 B1 | 12/2014 | Hsu et al. | |
| 8,944,513 B2 | 3/2015 | Watt | |
| 9,360,547 B2 | 6/2016 | Ameti et al. | |
| 2004/0174260 A1 | 9/2004 | Wagner | |
| 2007/0103303 A1 | 5/2007 | Shoarinejad | |
| 2007/0262849 A1 | 11/2007 | Ismail | |
| 2009/0002165 A1* | 1/2009 | Tuttle | G01S 3/48 340/572.1 |
| 2009/0207024 A1 | 8/2009 | Schatz et al. | |
| 2010/0007496 A1* | 1/2010 | Orlassino | H04W 4/02 340/572.1 |
| 2012/0268250 A1 | 10/2012 | Kaufman et al. | |
| 2014/0183261 A1 | 7/2014 | Ung et al. | |
| 2014/0184391 A1 | 7/2014 | Elizondo, II | |
| 2014/0253296 A1 | 9/2014 | Arthaber | |
| 2016/0035251 A1* | 2/2016 | Delplace | G09B 19/167 434/66 |

\* cited by examiner

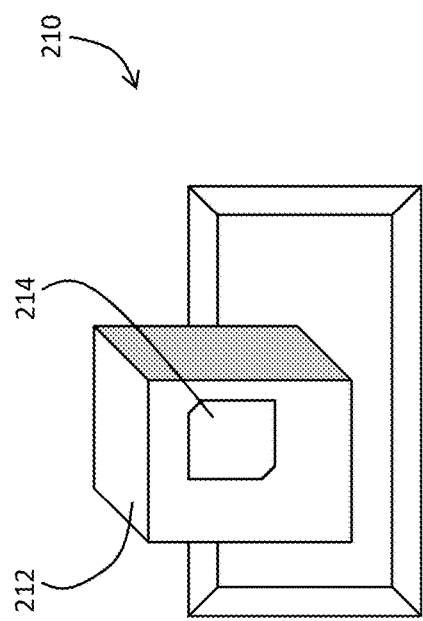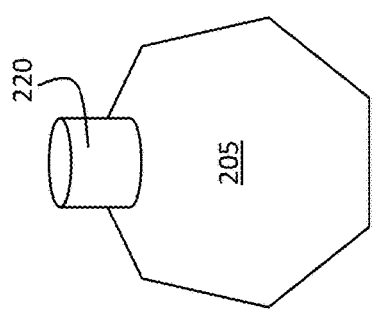
Fig. 9

PRODUCT AND EQUIPMENT LOCATION AND AUTOMATION SYSTEM AND METHOD

PRIORITY CLAIM

The instant application claims priority as a continuation in part of U.S. application Ser. No. 14/985,199 filed on Dec. 30, 2015, presently pending, which in turn claimed priority as a non-provisional of U.S. Provisional Application Ser. No. 62/230,132 filed on May 28, 2015, the contents of which are incorporated herein by reference.

BACKGROUND OF THE INVENTION

1. Field of the Invention

The field of the invention is a locating or tracking system for tangible objects (such as inventory, reagents, medicines, other products, and personnel) designed to automate distribution tasks within an enclosed space where traditional location technologies are not operable.

2. Background of the Invention

In various embodiments, the invention provides a multi-tier location system capable of real-time location and identification of assets within an enclosed space, such as a warehouse.

In one embodiment, the invention comprises a system which uses a large number of low-cost identification tags for individual assets, a dense array of readers which track the low-cost tags, and a top level logic tier which analyses the data from the readers.

Traditionally, fulfillment centers have incorporated tracking only for high-value assets and on an ad hoc basis with manual and work-intensive scanning of identifiers such as bar codes. In such systems, real-time tracking is implemented for only a subset of the tracked inventory, if at all. In the instant invention, the operator of a facility can track any identified item, using low cost devices, in real-time with a knowable level of precision.

A need exists in the art for a system that tracks items in locations where conventional location techniques are not functional or do not provide sufficient granularity.

SUMMARY OF INVENTION

An object of the invention is to create a device and method for tracking of assets within the premises. An advantage of the invention is that it allows for real-time control of inventory, machinery, and other assets.

Another object of the invention is to provide reliable location information in environments where traditional location technologies do not function. A feature of the invention is that it employs a multi-tier system to provide location information for tagged assets. An advantage of the invention is that it allows for location of assets indoors and in other environments where traditional location technologies cannot be implemented.

Yet another object of the invention is to provide information while relying on simple and inexpensive identification tags. A feature of the invention is that the first tier of the system relies on passive RFID tags requiring little to no customization. An advantage of one embodiment is that the system can be scaled without incurring high costs per item.

A further object of the invention is to provide a system wherein location of a tagged asset is ascertained reliably. A feature of the invention is that in one embodiment multiple tiers of the system are used to reliably locate any one given tag. An advantage of the system is that it facilitates asset location while using multiple simultaneous readings from each tag.

Another object of the invention is to provide a system with redundancy features. A feature of the invention is in one embodiment, a multitude readers form an array of readers. A benefit of the invention is that a single point of failure does not exist within the system.

An additional object of the invention is to provide a system which can read asset identification tags in environments which include interference or which suffer from signal distortion. A feature of the invention is that the array of readers results in tags being detected in even difficult conditions. A benefit of the system is that assets are not misidentified and can be accounted for with known levels of precision.

A further object of the invention is to provide detailed analysis of data from many sources. A feature of the system is that in one embodiment a third layer of the system provides logic and analysis tools to convert raw data into actionable reports. A benefit of the system is that it gathers readings from many sensors simultaneously and provides actionable information from the raw sensor readings on demand or in real-time.

An additional object of the invention is to provide a system capable of being adapted to various environmental difficulties. A feature of the invention is that the design and layout of the reader sensors may be customized to account for problematic features within the environment of the asset tracking system. In one embodiment of the invention, the interference, number of readouts required, and other parameters are used in designing the layout of the middle tier of the system. A benefit of the system is that it is flexible and can be applied to demanding scenarios.

A further object of the invention is to provide a system which relies on power-efficient components. A feature of the invention is that, in one embodiment, several of the tiers use passive components and active components that do not draw large amounts of current. A benefit of the invention is that the many of the components do not require power sources and the tiers that require powered components can use long-life batteries and other convenient power sources.

An additional object of the invention is to create a tracking system which does not add manual steps or overhead to the asset management tasks. A feature of the invention is that the need for manual scanning or physical confirmation of inventory is obviated. A benefit of the invention is that a system incorporating an embodiment of the invention can be run automatically.

A further object of the invention is to facilitate a large scale deployment of a tracking system. A feature of the invention is that the system components can be scaled to any real-world scenario. A benefit of the invention is that the system may be deployed to account for locations of all assets in an environment.

An additional object of the invention is to provide a way to track dissimilar products. In one embodiment, a feature of the invention is that the tagging of assets can be done using a number of different tags, depending on the type of asset to be tagged. A benefit of the system is that it allows for flexibility in selecting type of lowest level identification tags.

A system for location of assets on a premises comprising an RFID tag attached to an asset to be tracked; an array of RFID tag readers placed in known locations within said premises wherein said RFID tag readers activate and obtain tag information from each tag; and a control logic wherein said control logic reads information from said array of RFID tags; wherein said control logic triangulates the position of each tracked asset.

BRIEF DESCRIPTION OF DRAWING

The invention together with the above and other objects and advantages will be best understood from the following detailed description of the preferred embodiment of the invention shown in the accompanying drawings, wherein:

FIG. 9 depicts another overview of one embodiment of the invention;

DETAILED DESCRIPTION OF THE INVENTION

Figure 1:
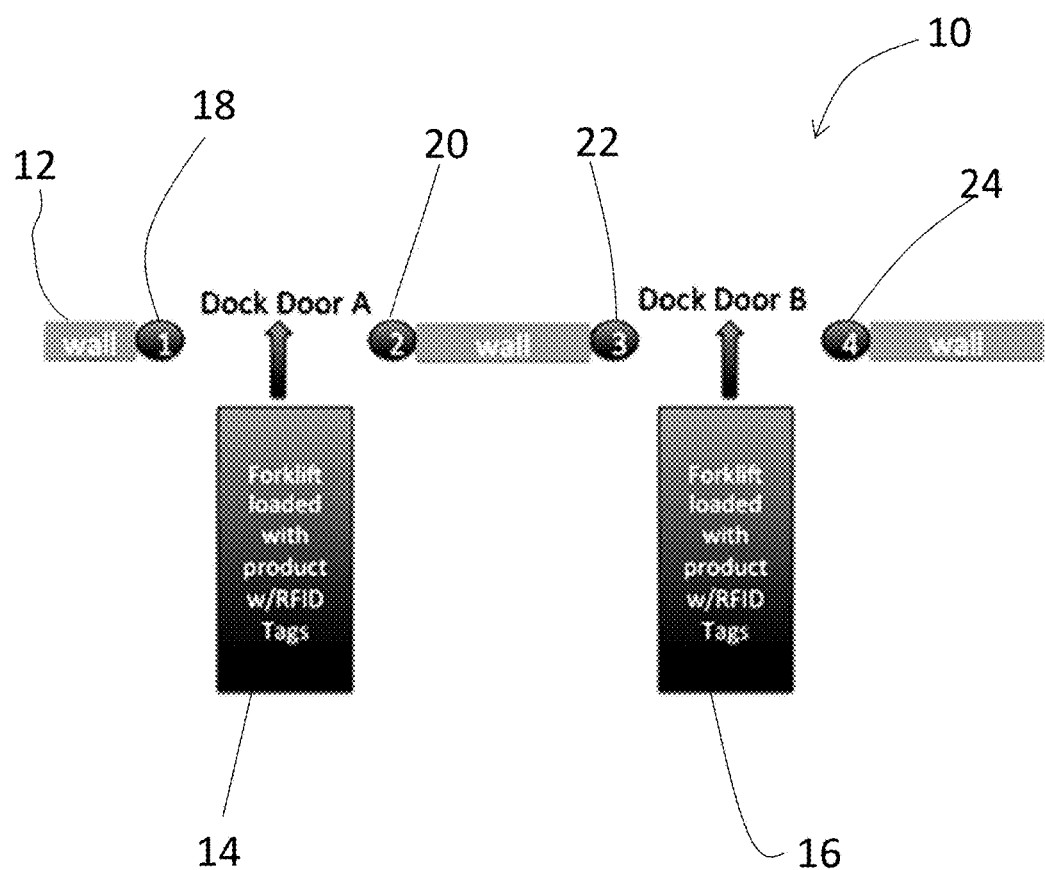
FIG. 1 depicts an overview of a prior art system.

The foregoing summary, as well as the following detailed description of certain embodiments of the present invention, will be better understood when read in conjunction with the appended drawings.

To the extent that the figures illustrate diagrams of the functional blocks of various embodiments, the functional blocks are not necessarily indicative of the division between hardware circuitry. Thus, for example, one or more of the functional blocks (e.g. processors or memories) may be implemented in a single piece of hardware (e.g. a general purpose signal processor or a block of random access memory, hard disk or the like). Similarly, the programs may be stand-alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Turning to the figures, FIG. 1, depicts a prior art approach 10 for single-point tracking. In the prior art approach 10, a series of tag readers 18, 20, 22, 24 are placed in strategic locations in a facility. As shown in FIG. 1, the strategic location is defined by the outer wall 12 which includes a pair of doors. Inventory from the facility is being transported using a first forklift 14 and a second forklift 16.

The first forklift 14 is approaching the first door which is surrounded by the first 18 and second 20 tag readers. The second forklift 16 is approaching the second door, which is surrounded by the third 22 and fourth 24 tag readers. In an optimum scenario under the prior art system, all the tags carried by the first forklift 14 would be read by either the first reader 18 or the second reader 20. Likewise all the tags carried by the second forklift 16 would be read by the third reader 22 and the fourth reader 24. In reality, however, there is cross-over in the tag readouts. As such, some of the tags on the first forklift 14 will mistakenly be read by the third 22 or fourth 24 readers. Conversely, some of the tags on the second forklift 16 will be mistakenly read by the first 18 and second 20 reader. Furthermore, some of the tags will be read by none of the four readers.

If a tag is read by the unintended reader then it may be identified as having been transported with the incorrect shipment. Such incorrect readings result in lost inventory and often require manual checking of cargo. Tags which pass unread also create problems of maintaining correct inventory.

In real-world scenarios the prior art system 10 depicted in FIG. 1 would be capable of correctly identifying the point and time of departure for about 90% of the inventory leaving the facility.

Prior art approaches use readers 18, 20, 22, 24, which are bulky and expensive. Further, the prior art readers 18, 20, 22, 24 can interfere and compete with one another. The readers act as independent devices and so adding more readers results in diminishing benefits, while the costs remain high. In some prior art approaches, each reader costs more than $1000.

Given the cost of incorporating readers 18, 20, 22, 24 into the system, prior art approaches have only a few strategic locations where the readers are found. In the embodiment of FIG. 1, the system is only able to detect once inventory is leaving the facility. For example, there is no way to detect the path that the first forklift 14 took in approaching the wall 12. As such, the prior art system 10 is not readily useable for inventory tracking within the facility.

In order to address these shortcomings, most prior art systems 10 add manual checks and additional identification tasks which use non-RFID based systems, such as optical scanners, image detection, bar codes, and the like. The result is that prior art systems 10 are complicated, expensive, and yet lack tracking features that would add value to the business process.

Three Tier Design

Figure 2:
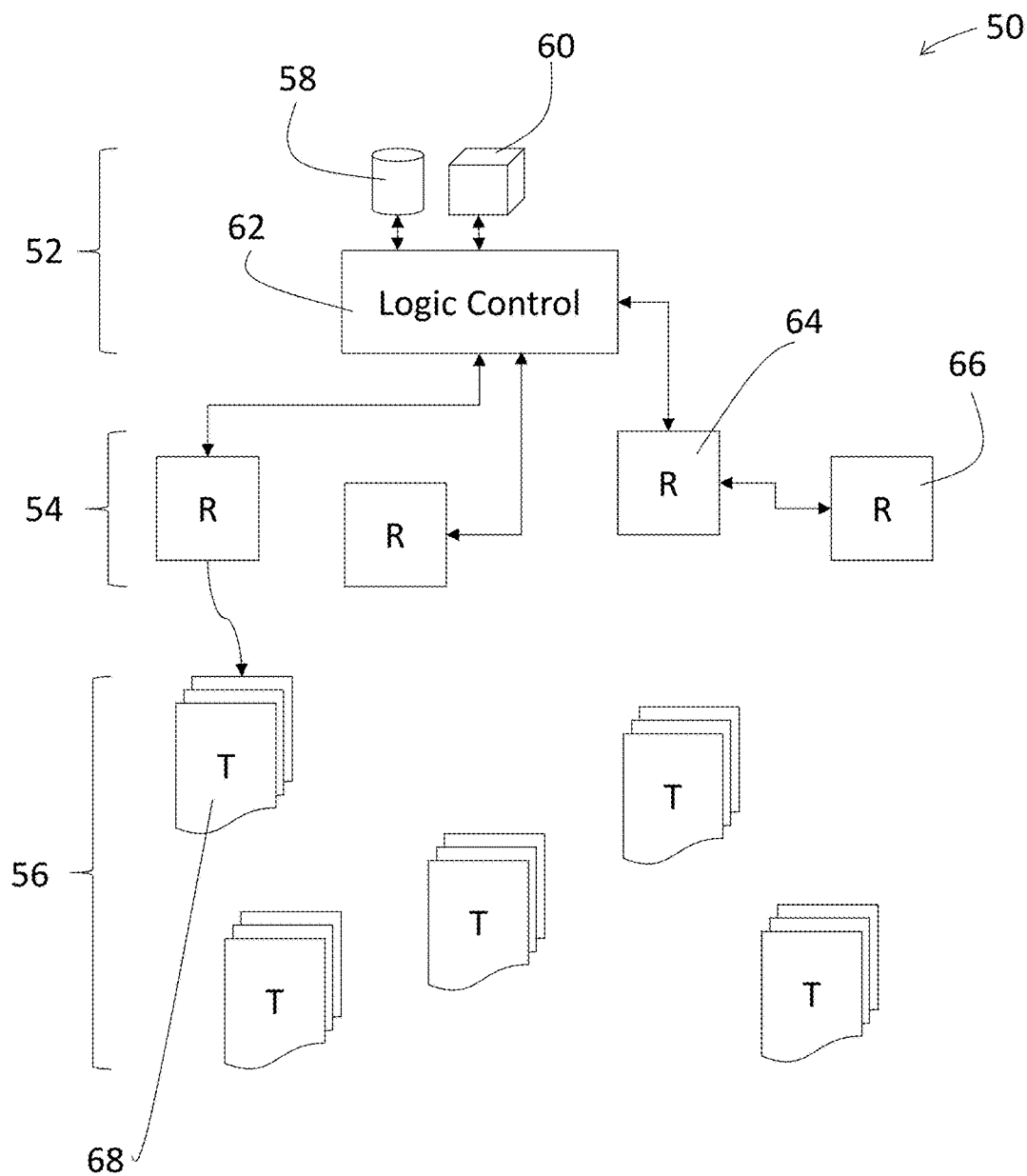
FIG. 2 depicts an overview of one embodiment of the invention.

As shown in FIG. 2, the invented system 50 comprises three logical layers 52, 54, 56, in one embodiment, that overcomes the drawbacks of the prior art. The system uses a logic layer 52 to manage the remaining components. In communication with the logic layer 52 is the reader layer 54. Members of the reader layer 54 activate and read the identifiers of the tag layer 56.

As shown in FIG. 2, the logic layer 52 comprises at least one logic controller 62. The logic layer 52 further includes at least one data store 58 and at least one user interface 60.

In one embodiment, the logic controller 62, data store 58, and at least one user interface 60 are implemented in a single system, such as a server having access to a database management software and an interface, such as a web-based reporting interface which generates reports on the basis of information found in the data store 58. The logic controller 62, however, is not a passive device, in one embodiment, and performs calculations on the data stored in the data store 58, such as triangulation discussed supra.

In another embodiment, the logic controller comprises distributing computing resources in communication with one another with data store 58 shared between the computing resources and resulting user interface 60. In one embodiment, the logic controller 62 is physically located in the same facility as the rest of the system components, in another embodiment, the logic controller 62 is located at a physically remote site.

The reader layer 54 of the system comprises a network of RFID readers (designated with the letter R in the schematic). As shown in FIG. 2, the RFID readers of the reader layer 54 are in two-way communication with the logic controller 62 of the logic layer 52. In the embodiment shown in FIG. 2, one of the readers 64 is in direct communication with the logic controller 62, while another reader 66 is communicating with the logic controller 62 indirectly, that is by first passing its data to the direct contact reader 64.

The system 50 also includes the tag layer 56. The tag layer 56 comprises large sets of tags (depicted as T in FIG. 2). In one embodiment, the system 50 provides for reading and management of thousands of tags.

As each tag or sets of tags moves to proximity of a reader R, a tag 68 T will become activated and be read by a reader R.

Readers R of the reader layer 54 transmit to the logic controller 62 information including the identifier of the tag T being read by the reader R as well as the signal strength of the reading of the tag T.

For purposes of clarity of FIG. 2, the tags are shown as physical separated from the readers R. In use, the tags T should be in frequent communication with readers R with few areas of the facility not covered by a detection field of a reader R. Further, while the tag 62 being interrogated 68 by the reader R is shown as being interrogated by a single reader, in practice multiple readers may be interrogating the same tag in close proximity to one another.

The communication between the reader layer 54 and the logic layer 52 is accomplished using wireless media, in one example. Each reader R comprises an antenna to activate the tag T as well as an antenna to communicate with the logic controller 62. In one embodiment both antennas use Bluetooth. In another embodiment, Bluetooth or Bluetooth Low Energy (le) is used to activate the tag T while a WIFI connection is established in order to communicate with the logic controller 62.

Tags

In one embodiment, the tags comprising the tag layer 56 are attached to all items to be tracked within the system. The assets to be tracked include trays, compartments, totes, ID cards of staff members, vehicles, actuator arms, and other components. In one embodiment, the tags T are attached using a removable adhesive. For some assets, the tags T include autonomously broadcasting elements. While in most applications each tracked item has its own tag T, in other applications certain containers have multiple tags T. For example, in one embodiment totes designed to store multiple items have multiple tags.

The tag layer 56 allows for tracking of any asset, not merely high-value items. The tag layer 56 can be used to track the entire inventory of a warehouse, components used in a process, and others. In one embodiment, the tag layer 56 is used to track the use level of an expendable item, such as amount of medicine in a container. In this embodiment, the tag layer is used to indicate whether the item is empty, expired, damaged, or other status, based on the tracked item's pattern of use, its proximity to other equipment and other parameters.

In one embodiment, a passive tag T includes am Ultra High Frequency (UHF) antenna which is activated by a radio-frequency field generated by a reader, and a response signal is broadcast upon activation. In one embodiment, some tags are self-powered and send a response signal upon receiving the appropriate signal from a reader.

In one embodiment, the tags cost between $0.10 to 0.50 per unit and each tag has a broadcast range of 3 to 30 feet. Each tag has a useable life of 5 to 10 years.

Readers

The reader layer 54 comprises a set of readers R, as shown in FIG. 2. In one embodiment, the location of the readers R is determined on basis of real-world performance characteristics of the physical location where the system is being implemented. For example, in some embodiments, as part of the layout of readers R, measurements of interference are completed.

Figure 3:
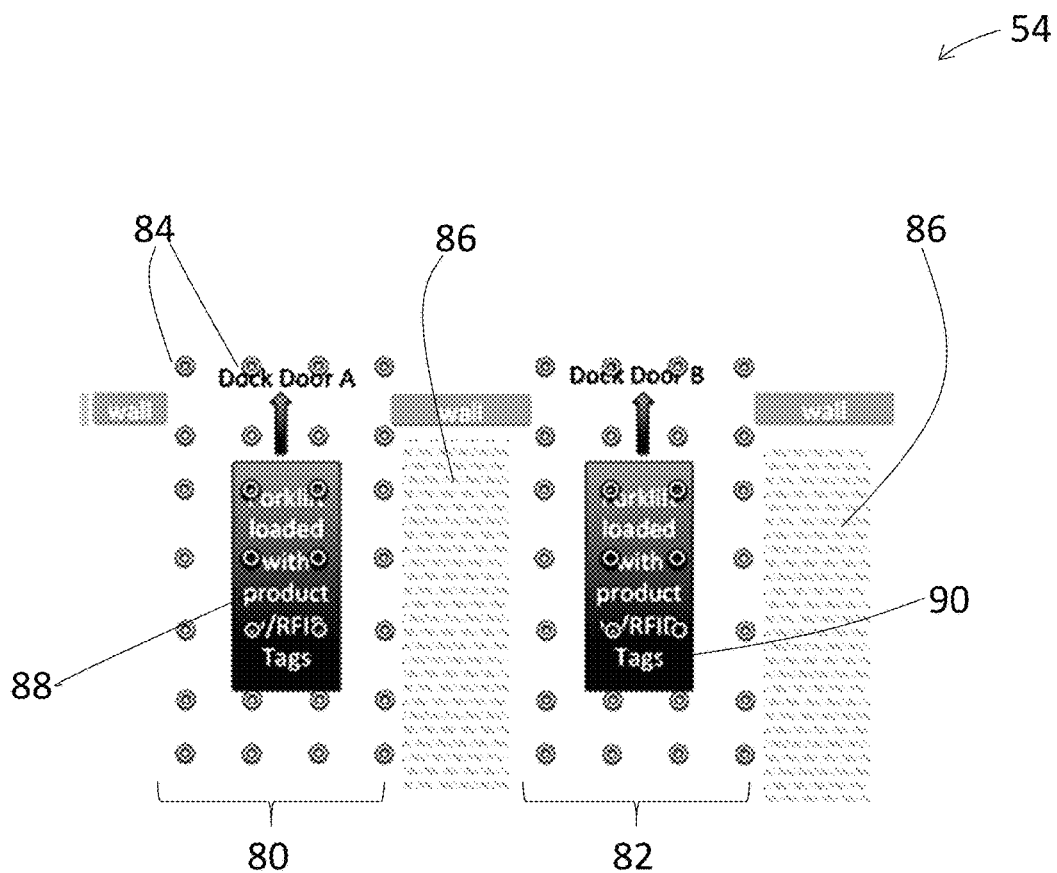
FIG. 3 depicts a detailed view of one tier pursuant to one embodiment of the invention.

Turning to FIG. 3, depicted therein is one arrangement of the reader layer 54. The reader layer 54 comprises an array 80, 82 of individual readers 84.

As shown in FIG. 3, the first array 80 of readers comprises an array of 4 by 7 readers for a total of 28 readers. The second array 82 likewise contains 28 readers. As each forklift 88, 90 traverses the array 80, 82, the tags held on the forklift 88, 90 are read by several readers 84. The readers then forward the data to the logic controller 62 (not shown in FIG. 3).

The reader layer 54 is customizable in that areas of the facility which are inaccessible to product, such as closed off areas 86 do not require reader tags to be placed therein. The density of the first array 80 and the second array 82 is set to correspond to the maximum velocity of the first 88 and second 90 forklift. In one embodiment, the operator of the respective forklift 88, 90 is notified if the speed of traversal of the array 80, 82 exceeds the maximum speed rating.

In the embodiment shown in FIG. 3, the readers are placed in an array such that at any given time the products on each forklift are in communication with at least six readers 84. In one embodiment, the grid defined by either array 80, 82 has individual reader 84 within 30 feet of one another, as required to activate the UHF tags discussed infra.

The density of the array 80, 82 is determined in response to interference, type of product to be tracked, and activity being performed in a given area. For example, grid patterns are used for the following products:

---
Product Containers Comprising Primarily
Dry Goods
Metallic or Magnetized Components
High Value Medical Products
Slow Moving Bulky Containers

---

As can be appreciated, the amount of expected interference is an important factor in designing the array 80, 82. However, the grid cannot be too dense by having too many individual readers 84. This would increase the cost of covering a warehouse or other facility, and would result in interference.

In one embodiment, the individual reader 84 comprises a low cost active element comprising a UHF activation system and a simple communication system for transmitting data to the logic controller 62.

In one embodiment, the readers 84 comprise a Bluetooth LE sensor with a 330 foot range and a cost of $20 to $100 per unit. The reader 84 includes a non-rechargeable battery, but it is user replaceable.

In one embodiment, each reader 84 includes a standards-compliant network and management interface such as the Zigbee communication protocol. In one embodiment, the readers 84 forward information from each other to the logic controller 62 using a mesh routing protocol. In one embodiment, the information transmitted by each reader 84 is encrypted.

Logic Layer Embodiments

The logic layer 52 receives data from the individual readers 84. The logic layer 52 includes at least one logic controller 62. In one embodiment, the logic layer also comprises a number of intermediary devices which collect data from the individual readers 84. The logic layer 52 is responsible for turning the data received from the individual readers 84 into actionable reports.

Figure 4:
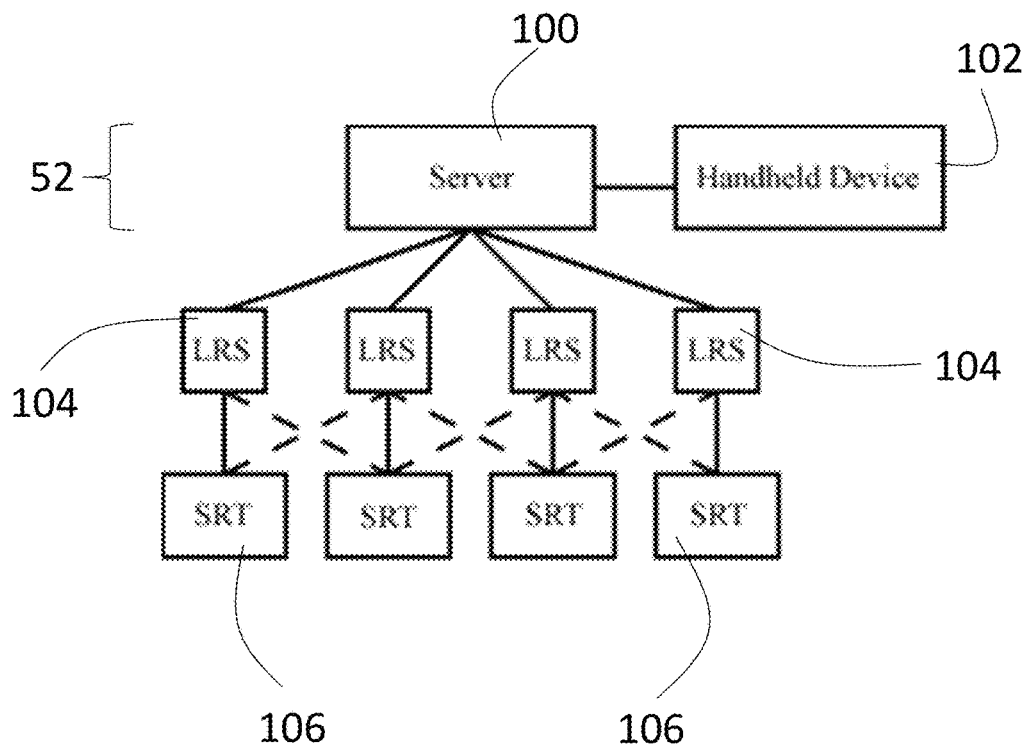
FIG. 4 depicts a schematic of one embodiment of the invention.

In one embodiment, shown in FIG. 4, the logic layer 52 comprises a server 100 and at least one handheld device 102. The handheld device interfaces with the server and assists in the communication with the tag readers 104. The tag readers 104 are in intermittent communication with the tags 106. The handheld device 102 does not read the individual tags 106.

Figure 5:
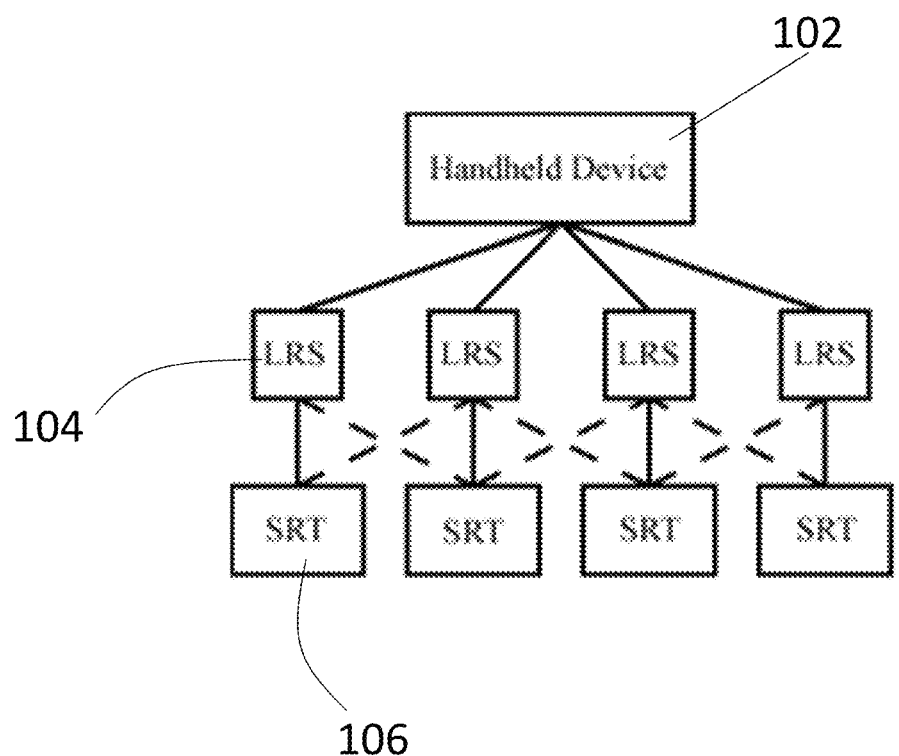
FIG. 5 depicts a schematic of a different embodiment of the invention.

A handheld device 102 may also communicate directly with the readers 104, as shown in FIG. 5.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

The triangulation of signals is performed by the logic layer 52 by compiling signal strength readings from individual tags as they pass in proximity to particular readers 84.

In one embodiment, the location of all readers 84 is mapped as an initial step in the design of the system.

Data Transmission Details

Figure 6:
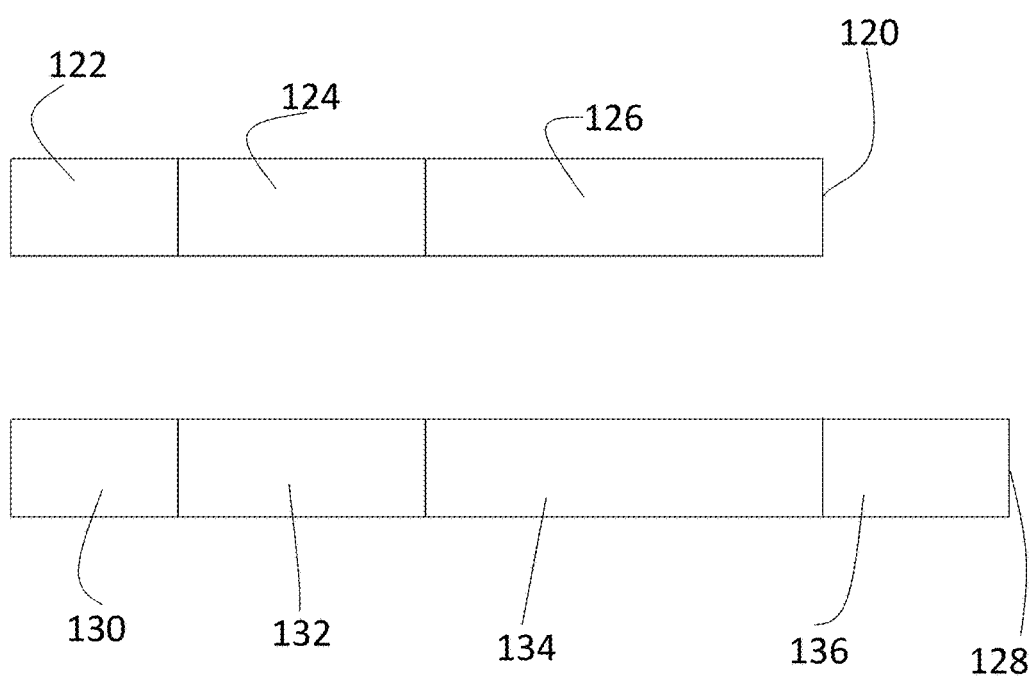
FIG. 6 depicts a data packet which is received by a tier of the system in one embodiment of the invention.

The details of the data being transmitted by each of the tags is shown in FIG. 6. A sample data packet of the data sent from a tag to a reader comprises a header 122 and a payload. The payload includes a tag identifier 124 and a signal strength value 126.

Upon being received by a reader, the data packet 120 is forwarded to the logic controller by the receiving reader. The data packet from the reader 128 comprises a similar header 130 and payload. The payload in turn comprises the tag identifier 132, signal strength value 134 and reader identifier 136.

While in FIG. 6 the information is shown as being sent as a single packet, in various embodiments the information is sent using payloads having many packets. In one embodiment, the header 122 of the tag packet 120 is different from the header of the reader packet 128 inasmuch as the tag packet 120 is not addressed to a specific reader.

In one embodiment, the signal strength value 126, 134 includes a time stamp for the signal strength measurement. In another embodiment, the time value is stored in the header 122, 130.

Triangulation Details

In one embodiment, multiple readings of the signal strength values 134 received from the reader data packet 128 are used to triangulate the location of a tag. In one embodiment, as the number of readers increases, the triangulation becomes more precise.

In one embodiment, in order to triangulate a tag the logic controller 62 compares the signal strength value of the tag with neighboring tags, especially where one of the neighboring tags has already been triangulated.

In one embodiment, the triangulation results include both a location at a given time as well as a direction of movement.

Communication Details

Figure 7:
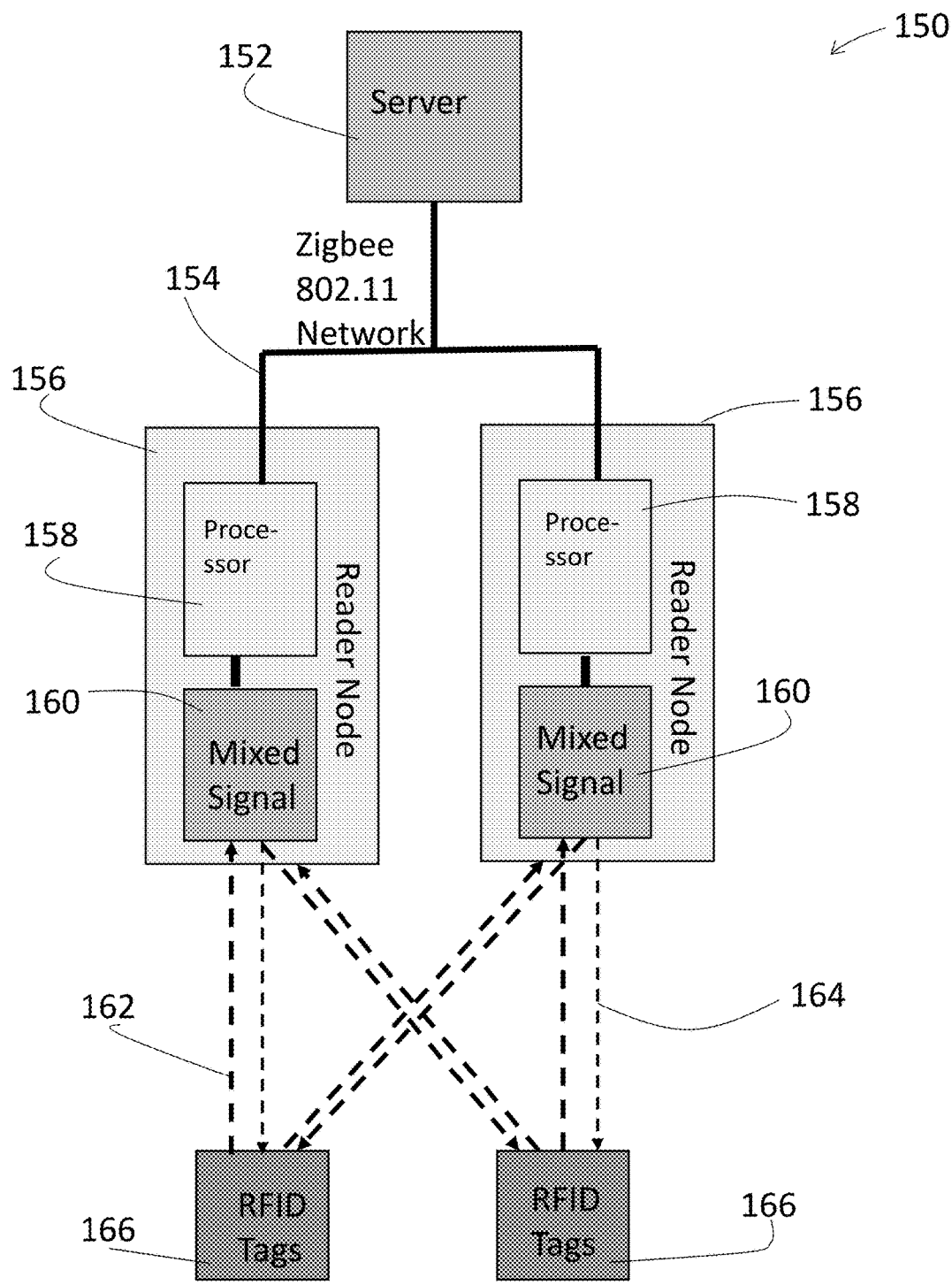
FIG. 7 depicts an overview of one embodiment of the invention.

The details of communication between the various layers are depicted in FIG. 7. The depicted embodiment 150 of the system comprises a server 152 in communication with the reader nodes 156 using a wireless network 154. The wireless network, as shown in FIG. 7 comprises a Zigbee 802.11-compliant network. The wireless network 154 is received by each node 156. As shown in FIG. 7, the wireless network 154 operates on shared media, such as wireless spectrum, but each node 156 has a connection to the server 152. The reader node 156 connection 154 to the server 152 is constant and directed, unlike the tag signal network 162 which is intermittent and the signals sent by the tags are not addressed to any particular reader 156.

Each reader node 156 comprises a processor unit 158, which in turn comprises a data exchange bus, central processing unit, and memory (individual components not shown). The bus connects the processor unit 158 to the mixed signal interface 160. The server 152 connection 154 is also coupled to the central processor. In instances where the connection 154 is not available, readings from the mixed signal receiver 160 are stored in cache memory within the processor unit 158. However, as the system is designed for real-time analysis, the data in cache memory is not stored indefinitely and has an expiration date and time for when a node 158 is isolated from a server 152 connection (either a direct connection or a connection through a neighbor node).

The mixed signal receiver 160 provides an energizing radio frequency signal 164. Upon being energized, the node 166 broadcasts an identifier signal 162. In the depicted embodiment, the identifier signal 162 and the energizing signal 164 are broadcast over a wide area and are received by as many different tags 166 and receivers 160 as possible.

Additional Embodiments

Figure 8:
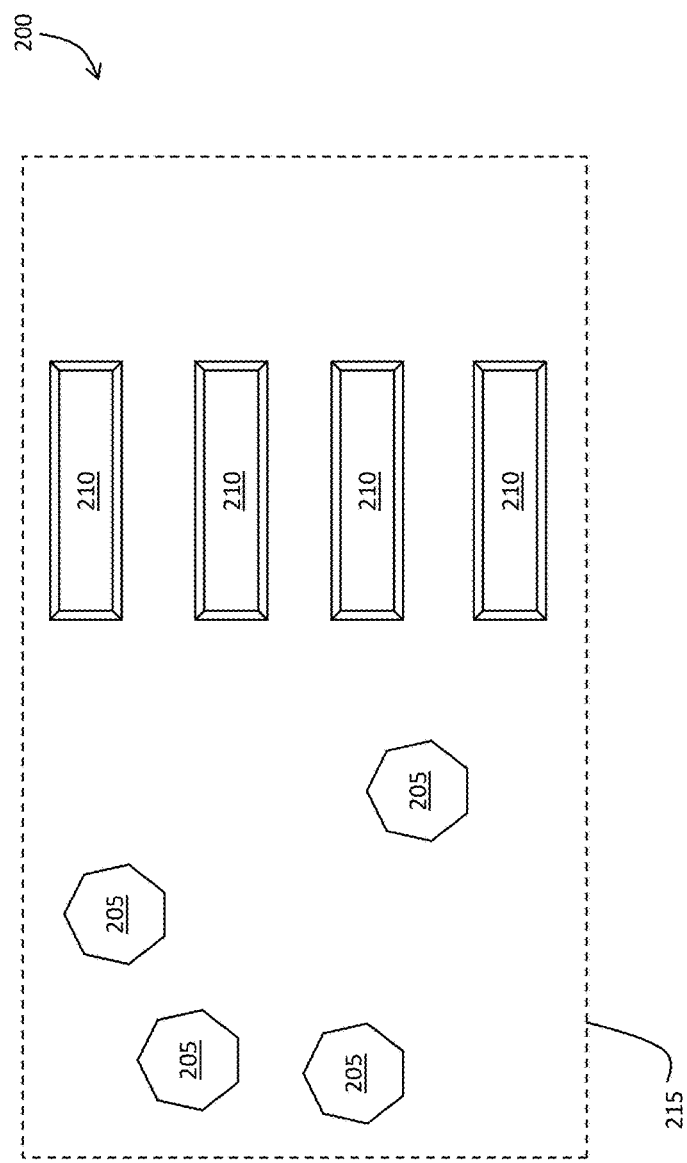
FIG. 8 depicts a schematic overview of another embodiment of the invention.

An overview of another embodiment 200 is shown in FIG. 8. The embodiment 200 generally operates within a facility 215 which contains storage areas 210 and one or more mobile inventory manipulators or movers 205.

In one embodiment a mover 205 is an autonomous mobile robot. In another embodiment, a mover comprises a forklift, a cart, a pallet with wheels or even facility 215 staff members, or any combination of the above. Each mover 205 includes the ability to move within the facility 215 as well as having on-board storage for inventory. The purpose of each mover 205 is to take inventory from a first storage area 210 to either a different storage area 210 or to a different location within the facility 215, such as a loading dock or automation module.

A primary attribute of the embodiment 200 is that the location of each mover 205 can be determined at any time t using the physical location means described below. The contents of each mover 205 is known at the time t. On the basis of that data, an embodiment of this system tracks the contents of each facility 215 storage area 210. Therefore, the system 200 allows for accurate inventory management throughout the operation of the facility 215, at any arbitrary time t, and not only during the times that a confirmatory inventory check has taken place.

The tracking of each mover 205 is accomplished using sensors added to each mover 205. The embodiment 200 as described below can track inventory as it moves within the facility 215 to within +/−12 inches (approximately 30 cm). The embodiment 200 employs inexpensive hardware which can be deployed in a limited time frame. Nonetheless, the embodiment 200 provides for high accuracy in identifying and tracking of inventory and can locate inventory in three dimensions and can track its position with respect to time. Therefore, the embodiment both locates inventory by recording its position in three dimensions as well as tracking inventory as it changes position in time. In one embodiment, a report generated by the system is a path taken by particular inventory through the facility over time.

The embodiment 200 can be permanently added as a feature to a facility 215 or it can be leased as needed. In this way, the embodiment 200 can create a recurring revenue stream by providing a high precision inventory location as a service for a facility 215. The system can also be controlled, so that in one embodiment, complete tracking is only performed for some periods of time, such as when high value items are moving through the warehouse, or if there have been incidents of inventory theft at a particular location.

While in the embodiment shown in FIG. 8, the storage areas 210 are depicted as unitary objects, in a modern warehouse, the storage areas comprise multiple means of storing individual inventory items, such as trays, totes, boxes, pallets, carts. In one embodiment, the system 200 is informed of the appropriate mover 205 to interact with a particular type of storage area 210. For example, a forklift mover 205 would be deployed to retrieve a pallet from a storage area 210. In one embodiment, the choice is made by external software wherein the external software uses a series of sensors and set preferences to select the appropriate mover. In another embodiment, the system 200, includes the mover 205 selection algorithm.

As shown in FIG. 9, the details of a storage area 210 is shown. The storage area includes at least one inventory item 212. The inventory item 212 requires tracking. The inventory item 212 includes a short-range passive identifier 214 such as a passive RFID tag. The short-range passive identifier 214 contains a unique identifier and other information about the inventory item 212, such that when a mover 205 interacts the inventory item 212, the status of the inventory item 212 is known.

The passive identifier 214 is a passive RFID tag, in one embodiment. The corresponding reader on the mover only needs to interact with the identifier 214 at the time the inventory item 212 is undergoing motion. It is not necessary to read the passive identifiers while the inventory item 212 is stationary.

While a passive RFID tag is used in one embodiment, other passive identification means are possible, such as printed two-dimensional bar codes, image verification, and others. The key requirement is that the passive identifier 214 must be unique and must be capable of reliable reading by the mover interacting with the item 212.

Technologies such as passive RFID tags can be used to uniquely identify items, but are a poor choice for determining accurate positions of items in large scale complex physical environments, such as a factory floor or a warehouse filled with steel racks that interfere with the short range signals. However, as in this embodiment 200, each mover identifies the inventory item 212 once the item is being moved, a passive short range identifier 214 is optimal as it allows for unique identification of an inventory item. In another embodiment, the item 212 is tracked and verified at continuous times. A different system, described below, is used for tracking of position.

In one scenario each mover reads and identifies tags on an inventory item. In another use scenario each mover reads and identifies a container carrying at least one inventory item, or an empty container, or some combination of empty containers and containers carrying inventory. In the container-based scenario, the system tracks individual containers. An external data store of container contents is used to track individual items. In one embodiment this container contents data store comprises a database populated with inventory information by the provider of the containers. In either scenario, the system's end user can deduce what inventory the mover is carrying and by tracking the position of the mover provided by the system with respect to time. In this way, the system assists in tracking inventory in motion, even if the individual items are stored in larger containers.

The mover 205 interacting with the storage area 210 inventory item 212 includes a mobile sensor package 220, which allows the mover 205 to both identify the inventory item 212 as well as report the position of the inventory item 212 as it moves with the mover 205 throughout the facility. The details of the sensor package 220 will be described below.

Mobile Sensor Package

Figure 10:
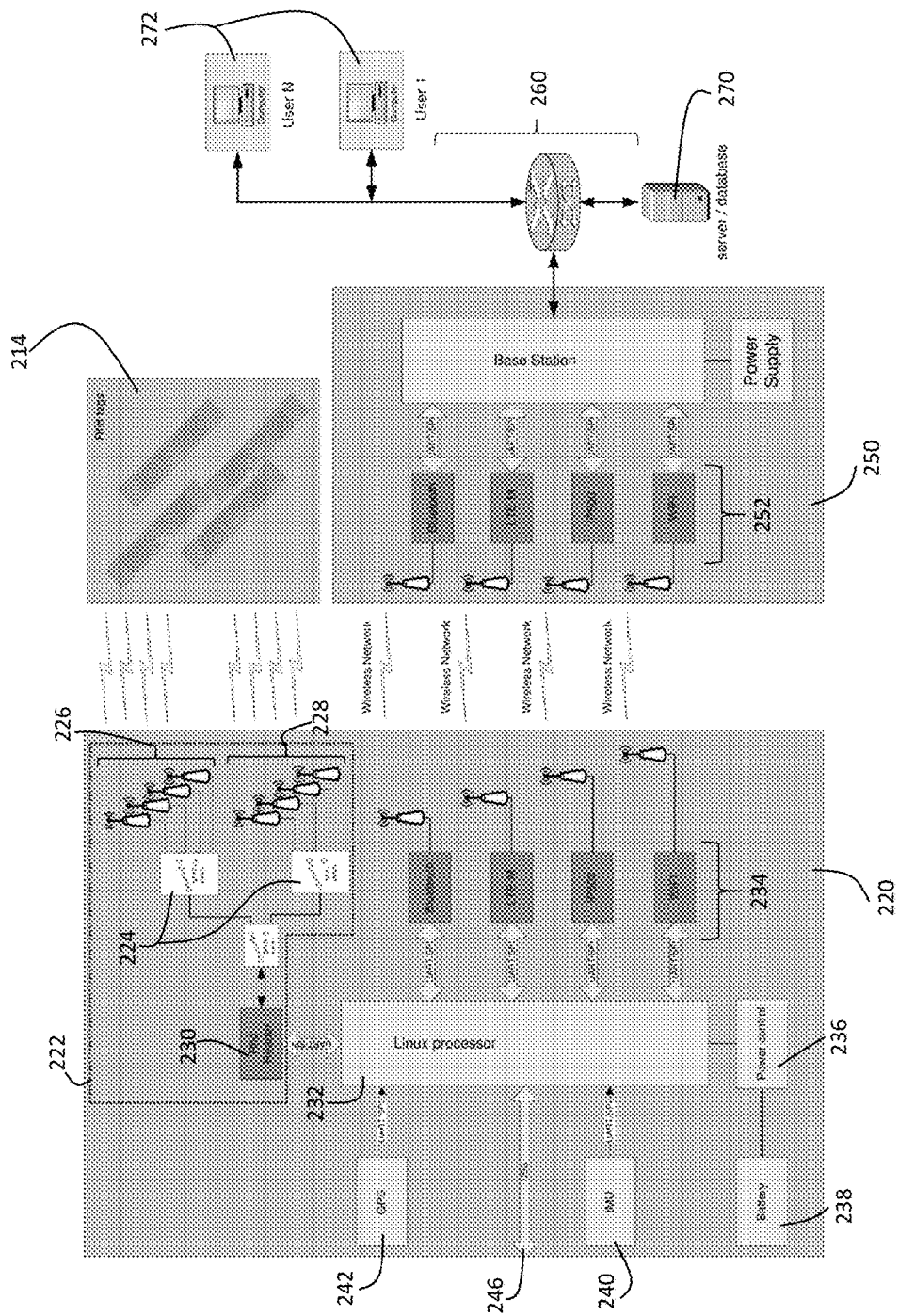
FIG. 10 depicts a component of one embodiment of the invention.

As shown in FIG. 10, the sensor package 220 includes a number of input and output systems. The sensor package communicates with a base station 250, which in turn relays information over a network 260 to a central server 270. One or more users 272 interact with the server 270 using the network 260.

The users 272 are able to review the inventory status of the facility and, in one embodiment, can request that automated systems confirm the location of certain inventory items having tags 214. In another embodiment, the users 272 will receive alerts about unexpected behavior of the inventory or if the inventory is not meeting targets, such as being ready for pickup at a warehouse dock. In another embodiment, the users 272 can request that the automated system download data to the user 272's computer system, various data about some or all of the inventory or some or all of the containers, permitting user 272 to analyze the data in various ways, including custom analyses.

The sensor package 220 includes components 222 for reading the inventory tags 214. In the depicted embodiments, the reader components 222 include a pair of signal switches 224, as the SP4T switches available from Analog Devices of Schaumburg, Ill. The reader components 222 further comprise two arrays of antennas 226, 228. The arrays of antennas 226, 228 are controlled by the switches 224 to read different types of inventory tags 214, in one embodiment. In another embodiment, the switches 224 operate the antennas 226, 228 in such a way as to prevent interference and obtain highest quality signal, ensuring reliable and noise-free reading of the inventory tags 214.

While the reading components 222 shown in FIG. 10 comprise readers of RFID tags 214, other forms of inventory item identification are used in other embodiments. In other embodiments, not shown, the reading components 222 include a camera, a laser scanner, and a chemical sensor.

The reading components 222 are controlled by the reader 230 system which in turn communicates with the processor 232 of the mobile sensor package running a control program.

The processor 232 is also in communication with a number of external network communications systems 234, such as Bluetooth, LTE-M, IP500, Wifi, shown in the sensor package 220 depicted in FIG. 10. The external communications systems 234 interact using wireless communications with corresponding communications systems 252 in the base station 250. The mobile sensor package 220 includes multiple external communications systems 234 so as to be compatible with many possible base stations 250 and also to be able to select the type of wireless communication that is the most appropriate to the type of action being undertaken. For example, if the base station is physically near, the mobile sensor package 220 will use low power Bluetooth. If the base station is further away such that a Bluetooth connection is not feasible, the mobile sensor package could attempt to communicate using Wifi, or UWB.

While in the embodiment shown in FIG. 10 each connectivity system has its own antenna, in other embodiments, a single antenna can be used to send and receive different types of communications.

The mobile sensor package 220 also includes a power control system 236 and a battery-based power source 238. The power control system 236 will place the mobile sensor package 220 in a low power mode, unless the mover which hosts the mobile sensor package 220 is actually performing an action. The power control system 236 ensures that unnecessary wireless hardware is not operating, thereby maximizing the battery 238 life span.

In one embodiment the system seeks to optimize battery running time in between charges. In another embodiment, the system seeks to optimize battery life over the life span of the battery. In another embodiment, the power saving features are optional, depending on the power capabilities of the given environment.

The mobile sensor package 220 also includes the ability to measure its own movement, as the embodiment shown in FIG. 10 includes an inertial measurement unit or IMU 240. The IMU 240 includes at least one accelerometer and at least one gyroscope to report the velocity and orientation of the mobile sensor package 220.

In some applications the sensor package 220 can obtain a reliable GPS signal, such as if the host mover is used outdoors. As such, the sensor package 220 includes a GPS receiver 242, in one embodiment.

The mobile sensor package 220 processor 232 includes a general purpose CPU, memory, storage, and software designed to operate the components of the mobile sensor package 220. The processor 232 includes a direct external interface 246, shown as the USB interface, in the embodiment of FIG. 10. In other embodiments, the direct interface 246 comprises an Ethernet connection or even a direct user input and output interface including a connection to a terminal where a user can interact with the module directly.

In the embodiment shown in FIG. 10, the mobile sensor package 220 is configured using one of the external wireless connections, such as Wifi, by the user 272 interacting with the central server 270 which in turn sends instructions to the mobile sensor package 220.

The mobile sensor package 220 comprises components, such as an independently operated computer that allows the sensor package 220 to operate independently of the host mover.

The external interface 246 of the mobile sensor package 220 allows additional sensors to be added to the sensor package 220. In one embodiment there are other sensors in the sensor package 220 that are not used to read tags and identify inventory, but instead are used to capture data about the environment through which the inventory or container or mover moves. In one embodiment, the additional sensors track temperature, shock, vibration, humidity, dust and other particulates, chemical analysis.

The only requirement is that the processor 232 storage contain the necessary drivers to interact with the additional sensor. In one embodiment, if the processor 232 storage does not contain the drivers for a particular sensor, the mobile sensor package will communicate with a central server 270 to obtain the necessary software to operate the additional sensor.

In this way, the mobile sensor package 220 is both fully functional at the start, but also can be expanded as the needs of a particular deployment require.

While in the embodiment shown in FIG. 10, the mobile sensor package 220 is shown as having a GPS sensor 242, other location technologies can also be used. An alternative location technology is described below.

Each mobile sensor package 220 is mounted in a rugged enclosure (not shown). However, the enclosure is transparent to radio signals. In one embodiment, at least one mobile sensor package 220 is attached to a side of an autonomous inventory control robot, which moves from shelf to shelf picking up inventory trays. In another embodiment, the sensor package 220 is placed inside any container, such as a plastic tray or tote or cardboard box. The sensor package reads the contents of the container and can read nearby containers. For example in one scenario, the first container is traveling down a conveyor, and while it travels down the conveyor the container can also read other containers that it passes. If the container is stationary in a storage area, it can identify containers within its read radius. The location of the container is determined by UWB anchors that can read the UWB tag that is built into the MSP. In one embodiment, the container is also located by using its RFID or bar code reader to read RFID tags or bar code tags that are positioned in known locations along the path that the container might follow. As the container passes the tags, it reads them and can know its location.

In one embodiment, most of the mobile sensor packages 220 are mounted on inventory movers. However, some are mounted in fixed locations, such as a specific known passage, a door, or facility dock.

Alternative Location Technology

In one embodiment, each mobile sensor package 220 shown in FIG. 10 also comprises an active ultra-wide band (UWB) tag. This UWB tag is used to locate each mobile sensor package 220, and therefore to locate each mover (shown in FIGS. 8 and 9) which acts as a host to the mobile sensor package 220. Each mobile sensor package 220 includes an active UWB tag, which are read by UWB readers dispersed throughout the facility hosting the movers. The UWB readers are placed at known locations at the facility, and the UWB readers report the location of each UWB tag passing in proximity to the readers.

Using the signal strength and the known location of the UWB reader, the location of the mobile sensor package can be determined.

While in the description above the entire mobile sensor package included the UWB active tag, in another embodiment, a tag is placed directly on a mover separate from the package or other sensors. The mover also includes inventory tag components, such as the RFID reader components 222 shown in FIG. 10.

The UWB readers dispersed within the facility communicate to a central data depository, which in turn is analyzed by one or more systems to provide information about inventory status through dashboards, or other API's.

Using this inventory management system, only a few UWB readers placed strategically throughout a facility can provide constant information allowing software to compute inventory status, while individual items are tagged with disposable passive means, such as passive RFID tags.

In one embodiment, the UWB readers communicate with one or more base stations, in another embodiment, the UWB readers communicate directly with a storage system, such as a cloud-based log storage system.

Alternative positioning technologies include using dead reckoning by measuring the distance travelled from a known starting position, optical positioning using a camera, relying on a signal received by an ultra-narrow band antenna, GPS, WiFi triangulation, or any combination of the above.

Antenna Arrays

As was explained above, the sensor module 220 includes two arrays of antennas 226, 228. The configuration of the antenna arrays and the spacing of the antenna arrays is dependent on the area to be read and the technical restrictions on mounting the antenna and possible interference. Mechanical devices and the software operating the analog switches 224 shown in FIG. 10 shape the beam to maximize the detection of containers being carried by a particular mover, such as a robot or forklift.

In one embodiment, the sensor module 220 is approximately 1 meter long and includes four patch antennas, which in turn allow for different beam shapes to emanate from the module.

Data Processing Steps

Figure 11:
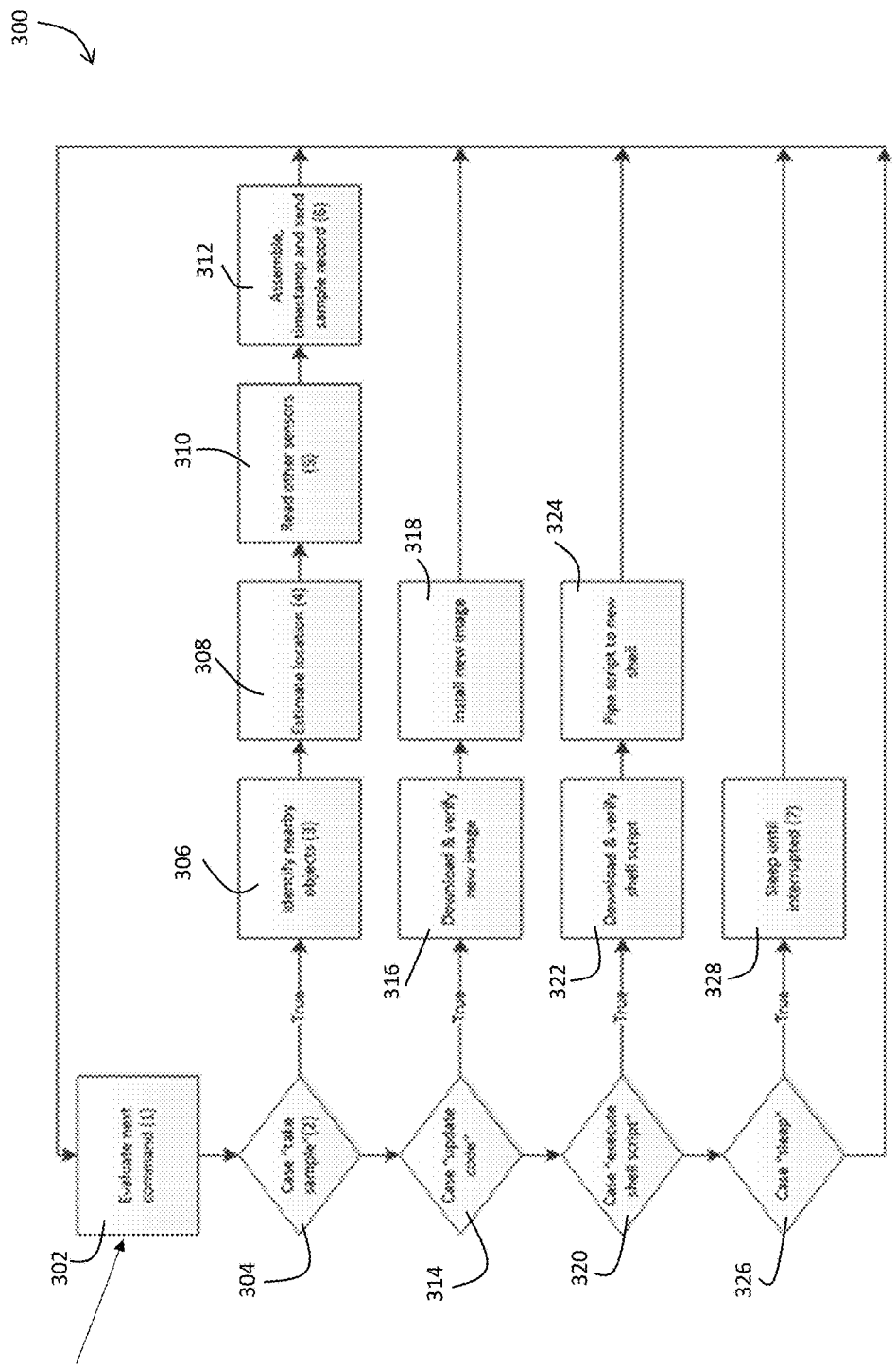
FIG. 11 depicts a data flow within one embodiment of the invention.

Data processing steps 300 of one embodiment are depicted in the flow chart shown in FIG. 11. The steps shown in FIG. 11 depict but some of the possible actions as data is collected by the mobile sensor package 220 and transmitted over a network 260 shown in FIG. 10. In one embodiment, the transmitted data is pruned (removing entries that reflect lost communications or data that arrived too late to be useful) and stored in one or more servers 270. The software running on the servers 270 includes one or more analytics packages that monitor the data for anomalies and alerts end users 272 when certain thresholds are met, as well as responding to queries from the clients.

Further, data is frequently presented using visualizations. In one embodiment, the data is shown to the end users 272 in the form of a virtual reality presentation that shows how the inventory is moving through a facility. In another embodiment, data from the serves 270 is integrated into an augmented reality application that allows authenticated users to review the path of a tracked inventory item through a facility.

The system allows the end users to both replay past events as well as monitor inventory movement in real time.

As was described above, the mobile sensor packages include connections to external sensors. In one embodiment, the system is used to supervise the conveyance of temperature sensitive inventory. In this embodiment, the server receives information about the location of each item, and also its temperature, to ensure that temperature requirements are met.

In another embodiment, each mobile sensor package includes a camera which transmits both images and video, which allows the end user 272 to view the video feed of inventory items moving through a facility. In one embodiment, this audiovisual signal is stored by the system and allows for visual monitoring of valuable inventory.

Turning to the details of the data flow 300 within a mobile sensor package 220, the mobile sensor package processor 232 (shown in FIG. 10), awaits the next command 302, in a starting state 302 (FIG. 11). One of the possible commands is to take a sample 304, in which case the MSP on the host mover uses its identification means such as an RFID reader to identify the nearby objects 306, and, in some embodiments, also estimates the location of the desired sample 308 and reads information from sensors 310. The MSP on the host mover then assembles the data record 312 which is time stamped and sent to the mobile sensor package base station.

Another possible command is to update the code 314. The code is then downloaded and its integrity is verified 316. The verification occurs using CRC checks or equivalent means in one embodiment. The software is then installed 318.

Yet another command is to execute a shell script 320. The validity of the shell script is verified 322 and the script is executed 324.

As was described above the mobile sensor package includes power saving components, and so one of the commands is to put one or more components (including nearly all) to a low power sleep mode 326. The sleep mode 326 continues until the sleep mode is interrupted 328. In one embodiment, the default mode of the module is sleep, and interrupts 328 can be received from multiple sources such as the arrival of a message on one of the wireless communications systems.

The above data processing steps are exemplary of the steps to be taken by the mobile sensor package. The key action for the mobile sensor package is both taking a sample of the inventory 304 and sending the data to the central repository 312.

Facility Network

Figure 12:
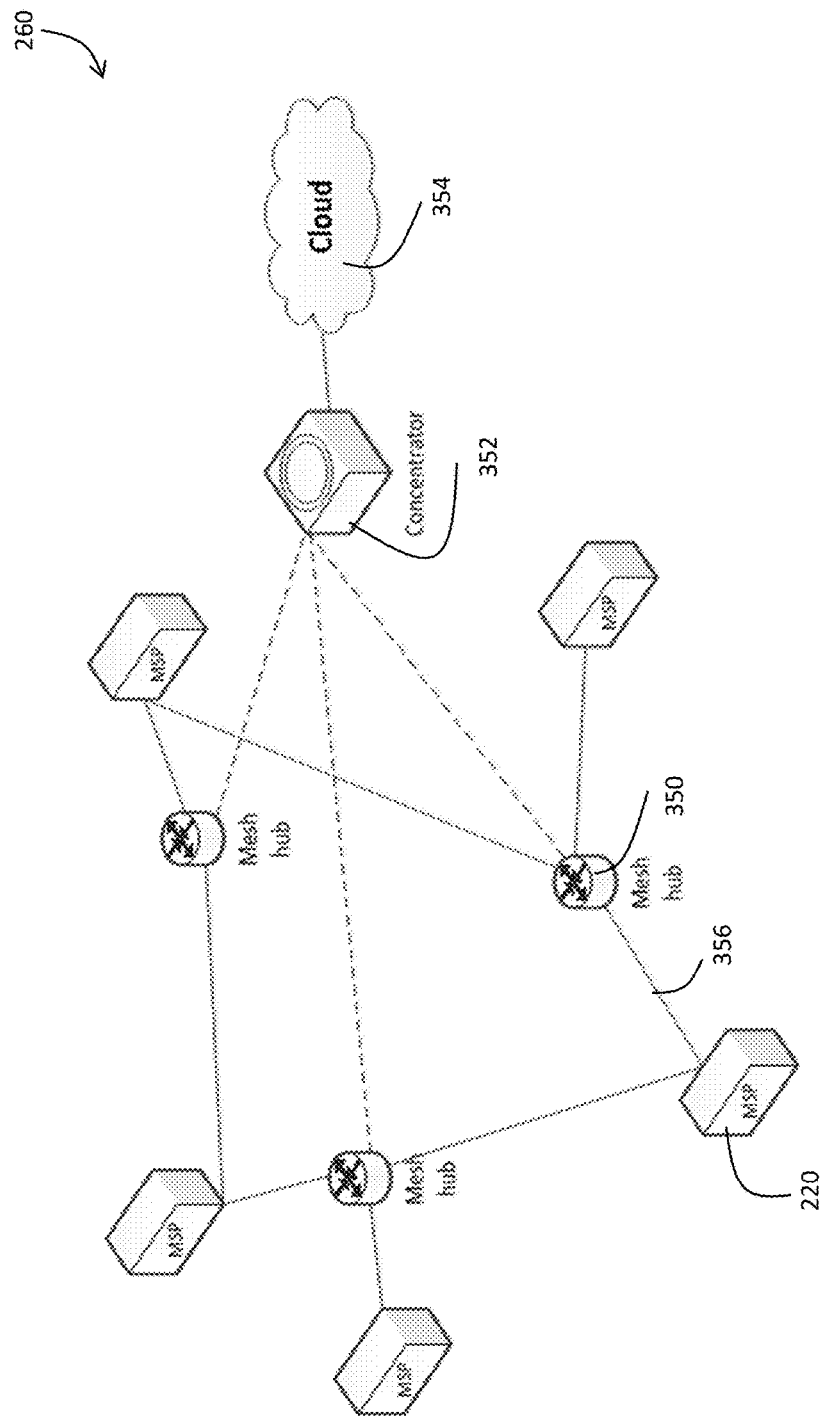
FIG. 12 depicts a network communications pattern pursuant to one embodiment of the invention.

A representation of the physical network 260 from FIG. 9 is depicted in FIG. 12. The network comprises multiple mobile sensor packages 220, which in turn communicate with wireless mesh hubs 350. Each mobile sensor package 220 may be in communication with more than one mesh hub 350. The mesh hubs in turn communicate with an on-premises concentrator 352, which processes the data from the hubs 350 and forwards it to the cloud network 354, in the depicted embodiment. In another embodiment (not shown) the concentrator 352 sends the data directly to a server.

While the concentrator 352 is depicted as a separate component in FIG. 12, in other embodiments, any hub 350 may also be designated as the concentrator. In yet another embodiment, the concentrator 352 functionality is integrated into the server. However, if the server which processes the data is not on the premises of the facility (as is the case of the embodiment in FIG. 12 which relies on a cloud link 354), the concentrator should be used to prevent the transmission of redundant, incomplete, and incorrect data.

The communications paths 356 shown in the embodiment depicted in FIG. 12 are bidirectional, in one embodiment. In another embodiment, some of the links are unidirectional, to prevent data cycles in the mesh topology and to optimize spectrum use.

While in FIG. 12 the output of the concentrator 352 is a connection to the cloud 354, the cloud 354 represents a public data storage and processing facility in one embodiment, a private set of servers and storage devices, or a combination of both, in local or remote locations, in various embodiments.

Sample Processing Steps

Figure 13:
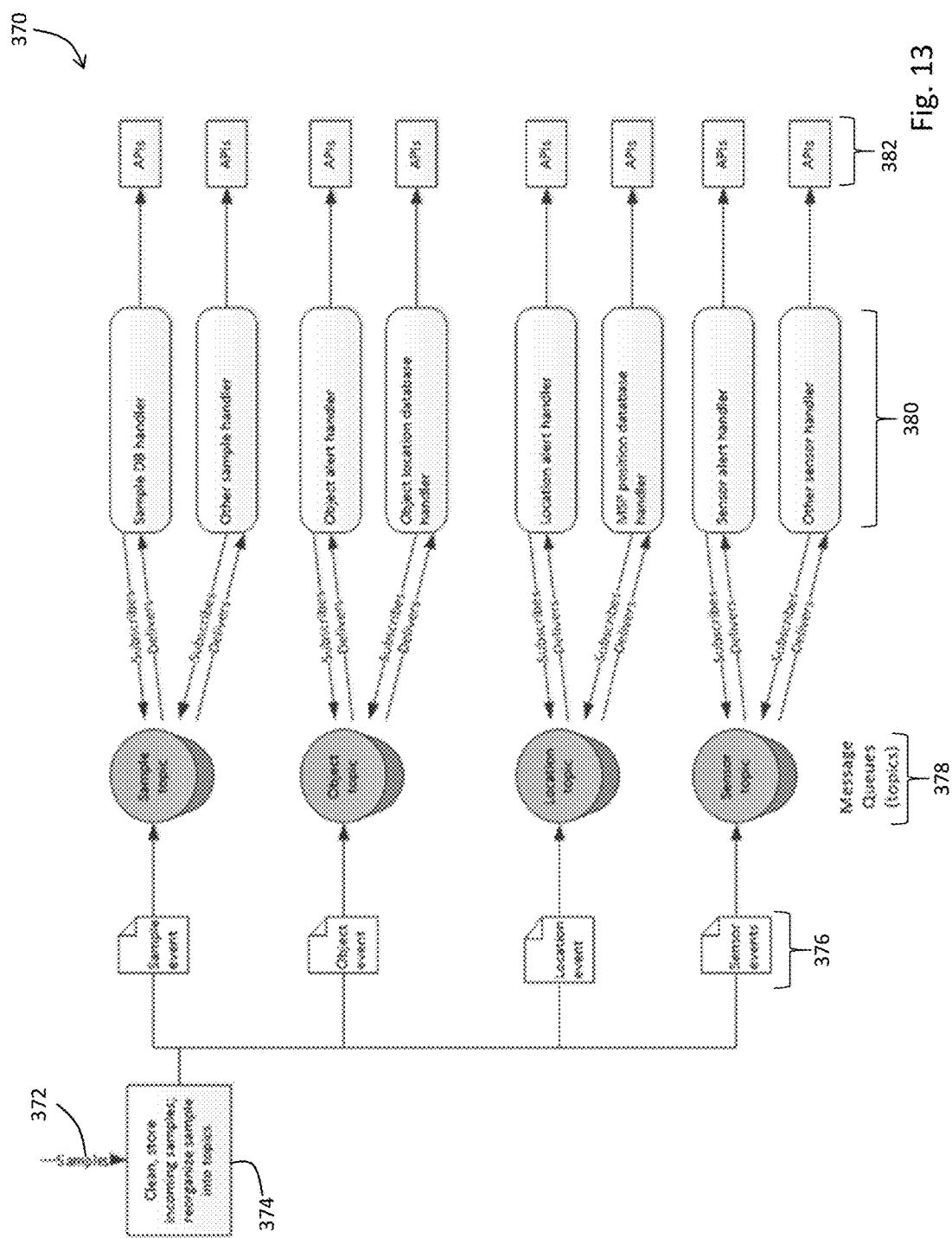
FIG. 13 depicts information processing details, pursuant to one embodiment of the invention.

Turning to FIG. 13, depicted therein are sample processing steps 370 pursuant to one embodiment of the invention. With respect to the infrastructure shown in FIG. 12, the sample processing steps of FIG. 13 occur within the cloud 354 from FIG. 12.

The input to the system is a sample 372. Each sample is first preliminary processed 374 and cleaned to remove any transmission noise, and a topic is assigned to each sample 372. While the samples 372 normally pass through a concentrator, certain pre-processing steps still may be required to address transmission errors, or eliminating redundant samples 372, especially when multiple concentrators are providing input to the sample processing steps 370.

The topics for each sample 372 include a classifier 376 and a processing queue 378. The topics, in the depicted embodiment include 'sample event,' 'object event,' 'location event,' and 'sensor event.' Each topic is assigned a queue 378. The topic is handled 380 depending on its properties.

The handlers interact with application programming interfaces 382, allowing the end users to interact with the sample data.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

The invention claimed is:

1. A multi-level system for location of assets on a premises comprising:
   identifiers attached to a group of one or more assets located on an enclosed interior area of the premises; wherein said assets are undergoing motion; and
   mobile sensor packages wherein each said mobile sensor package comprises data processing, data exchange, and storage components, a sensor for reading identifiers and each mobile sensor package further comprises a location tool within the premises;
   wherein at least one mobile sensor package is attached to each mover of assets on the premises; wherein said location tool comprises an ultra-wide band active tag which communicates with ultra-wide band readers located at fixed points within the interior of the premises; and wherein said sensor packages collect information from said identifiers.

2. The system of claim 1 wherein said identifiers comprise passive RFID tags.

3. The system of claim 1 wherein said mobile sensor package reader of identifiers comprises an array of antennas for reading passive RFID tags.

4. The system of claim 3 wherein said array of antennas is constrained to read just RFID tags in a specific nearby location.

5. The system of claim 1 wherein said mobile sensor package provides to an external data store lists of assets being carried by the mover carrying said mobile sensor package.

6. The system of claim 5 wherein said external data store also comprises a list of a time and a location for each asset group.

7. The system of claim 1 wherein said data exchange system comprises a wireless link between each mobile sensor package and a location system.

8. The system of claim 7 wherein said system provides for current positions of assets within the premises by combining each mobile sensor package data storage contents using the wireless link of each mobile sensor package.

9. The system of claim 1 wherein the readers of ultra-wide band active tags are located in known locations within said premises.

10. The system of claim 1 wherein said location tool triangulates the location of each mobile sensor package while said mobile sensor package is in motion.

11. The system of claim 1 wherein said identifiers comprise bar codes, image detection, or combination of detection of unique identifiers.

12. A multi-level method of tracking contents of a premises, the method comprising:
   attaching identifiers to a group of one or more assets located on an enclosed interior area of the premises; wherein said identifiers comprise passive identifiers;
   attaching mobile sensor packages to each mover of assets on the premises; wherein each said mobile sensor package comprises data processing, data exchange, and storage components, a sensor for reading identifiers and each mobile sensor package further comprises a location tool within the premises; wherein said location tool for each sensor package comprises an ultra-wide band active tag and wherein said premises further comprises readers of said ultra-wide band active tags at known locations;
   taking an initial inventory of stationary assets within the premises;
   moving assets within the premises only using movers which are equipped with mobile sensor packages; and
   reading the identifiers on the assets while moving said assets by a mover, recording the location of each group of assets as each group of assets moves through the premises.

13. The method of claim 12 wherein said identifiers comprise passive RFID tags.

14. The method of claim 12 wherein said mobile sensor package reader of identifiers comprises an array of antennas for reading passive RFID tags.

15. The method of claim 14 wherein said array of antennas is constrained to read just RFID tags in a specific nearby location.

16. The method of claim 12 wherein said mobile sensor package provides to an external data store lists of assets being carried by the mover carrying said mobile sensor package.

17. The method of claim 16 wherein said data exchange system comprises a wireless link between each mobile sensor package and a location system.

18. The method of claim 12 wherein said data exchange system comprises a wireless link between each mobile sensor package and the location system.

19. The method of claim 12 wherein the readers of ultra-wide band active tags are located in known locations within said premises.

20. The method of claim 12 wherein said identifiers comprise bar codes, image detection, or combination of detection of unique identifiers.

* * * * *